[12] United States Patent
Chen et al.

(10) Patent No.: US 11,180,239 B2
(45) Date of Patent: Nov. 23, 2021

(54) AIRCRAFT WITH SUPER HIGH ASPECT RATIO BASED ON SELF-UNFOLDING FOLDING WING TECHNOLOGY

(71) Applicant: Tsinghua University, Beijing (CN)

(72) Inventors: Haixin Chen, Beijing (CN); Xiaopeng Zhou, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 73 days.

(21) Appl. No.: 16/492,126

(22) PCT Filed: Jul. 13, 2017

(86) PCT No.: PCT/CN2017/092726
§ 371 (c)(1),
(2) Date: Sep. 7, 2019

(87) PCT Pub. No.: WO2018/171089
PCT Pub. Date: Sep. 27, 2018

(65) Prior Publication Data
US 2020/0269967 A1    Aug. 27, 2020

(30) Foreign Application Priority Data

Mar. 23, 2017  (CN) ........................ 201710179386.0
Mar. 23, 2017  (CN) ........................ 201720294253.3

(51) Int. Cl.
*B64C 3/54*    (2006.01)
*B64C 39/08*   (2006.01)
(Continued)

(52) U.S. Cl.
CPC ............. *B64C 3/546* (2013.01); *B64C 3/32* (2013.01); *B64C 9/00* (2013.01); *B64C 39/08* (2013.01)

(58) Field of Classification Search
CPC ............ B64C 3/546; B64C 3/56; B64C 39/08
See application file for complete search history.

(56) References Cited

U.S. PATENT DOCUMENTS 1,748,262 A * 2/1930  La Verne ................ B64C 3/546
                                                    244/218
1,842,637 A * 1/1932  La Verne ................ B64C 3/546
                                                    244/218
(Continued)

FOREIGN PATENT DOCUMENTS

CN          106927022        7/2017

OTHER PUBLICATIONS

WIPO, ISR for PCT/CN2017/092726, dated Dec. 28, 2017.

*Primary Examiner* — Joseph W Sanderson
(74) *Attorney, Agent, or Firm* — Hodgson Russ LLP

(57) ABSTRACT

Disclosed is an aircraft with a super high aspect ratio based on self-unfolding folding wing technology, the aircraft including: an aircraft body; a fixed wing; and a movable wing assembly including a first movable wing and a second movable wing. When the aircraft takes off, the first movable wing and the second movable wing are in a folded position. The first movable wing and the second movable wing are deflected and moved to an unfolded position or a folded position by the aerodynamic force and moment generated by the deflection of aerodynamic control surfaces and the differential thrust and moment generated by a distributed propulsion system.

20 Claims, 4 Drawing Sheets

(51) Int. Cl.
*B64C 9/00* (2006.01)
*B64C 3/32* (2006.01)

(56) References Cited

U.S. PATENT DOCUMENTS

| | | | | |
|---|---|---|---|---|
| 2,275,777 | A * | 3/1942 | Lane | B64C 3/54 |
| | | | | 244/218 |
| 2,288,501 | A * | 6/1942 | Wall | B64C 9/00 |
| | | | | 244/49 |
| 2,402,733 | A * | 6/1946 | Cooley | B64C 3/54 |
| | | | | 244/218 |
| 8,387,913 | B2 * | 3/2013 | Karem | B64C 3/56 |
| | | | | 244/49 |
| 8,657,226 | B1 * | 2/2014 | McGinnis | B64C 31/02 |
| | | | | 244/45 R |
| 8,757,538 | B2 * | 6/2014 | Seifert | B64C 3/546 |
| | | | | 244/46 |
| 9,545,993 | B2 * | 1/2017 | McGinnis | B64C 9/00 |
| 9,550,567 | B1 * | 1/2017 | Erdozain, Jr. | B64C 29/02 |
| 10,377,482 | B2 * | 8/2019 | Gibboney | B64C 3/54 |
| 10,814,958 | B2 * | 10/2020 | Easley | B64C 3/26 |
| 10,814,973 | B2 * | 10/2020 | Gaffney | B64C 29/02 |
| 10,864,988 | B2 * | 12/2020 | Gaffney | B64C 3/546 |
| 10,894,602 | B2 * | 1/2021 | Hefner | B64C 3/56 |
| 10,899,446 | B2 * | 1/2021 | Hefner | B64C 3/56 |
| 2012/0085858 | A1 * | 4/2012 | Seifert | B64C 3/42 |
| | | | | 244/46 |
| 2017/0113780 | A1 * | 4/2017 | Boye | B64C 23/072 |
| 2017/0283052 | A1 * | 10/2017 | Moshe | B64C 29/0033 |
| 2020/0010182 | A1 * | 1/2020 | Renteria | A63H 27/02 |

* cited by examiner

AIRCRAFT WITH SUPER HIGH ASPECT RATIO BASED ON SELF-UNFOLDING FOLDING WING TECHNOLOGY

CROSS-REFERENCE TO RELATED APPLICATIONS

This application is a U.S. national phase entry of International Application No. PCT/CN2017/092726, filed Jul. 13, 2017, which claims priority to Chinese Patent Application Nos. 201720294253.3 and 201710179386.0, each filed Mar. 23, 2017. The entire disclosures of the aforementioned patent applications are incorporated herein by reference.

TECHNICAL FIELD

The present disclosure relates to a field of aircraft technology, and more particularly, to an aircraft with a super high aspect ratio based on a self-unfolding folding wing technology.

BACKGROUND

The advantage of a super high aspect ratio wing is that it can realize lower cruise induced drag, thus it can be applied to gliders, long-endurance unmanned air vehicles, high-altitude transportation aircraft, etc. Therefore, it is expected to further improve the efficiency and mission performance of the aircraft by continuously increasing the wingspan and the aspect ratio on the basis of the existing aircraft models.

The increase of wingspan of conventional cantilever wing is limited by airport take-off and landing conditions, low-altitude unstable airflow, structural strength and rigidity of the aircraft, and required maneuverability of the aircraft. Its potential of lift augmentation-drag reduction has not yet been fully realized. In order to solve these problems, layouts of the super high aspect ratio/wingspan aircraft are realized by folding wing, stretching wing, strut-braced wing, cable-stayed wing, double/multi-fuselage, etc. Therefore, one of the key design problems of high-altitude long-endurance aircraft and other similar aircrafts is the layout of the super high aspect wing.

However, there are still many difficulties in increasing the aspect ratio on the basis of the existing models: for example, it is limited by runway width, hangar conditions, and etc. The conventional high aspect ratio wing layout has poor maneuverability and needs large turning radius, needs to maintain high route accuracy during approach phase. The wingspan is large, so high attitude accuracy should be maintained during the take-off and landing stage to prevent the wingtip from touching the ground, and the ability to resist crosswind is poor, thus requiring high meteorological conditions for takeoff and landing. The wing load is low, the wing root structure is under great pressure, and the low-altitude gust flight ability is poor.

SUMMARY

The present disclosure seeks to solve at least one of the technical problems existing in the related art. Accordingly, the present disclosure provides an aircraft with a super high aspect ratio based on a self-unfolding folding wing technology, which has the high aspect ratio and strong adaptability.

The aircraft with the super high aspect ratio based on a self-unfolding folding wing technology according to an embodiment of the present disclosure includes: an aircraft body; a fixed wing which is disposed to the aircraft body; and a movable wing assembly which is disposed to the fixed wing and includes a first movable wing and a second movable wing movable between an unfolded position and a folded position, in which the first movable wing and the second movable wing are respectively provided with an aerodynamic control surface and a distributed propulsion system. When the aircraft takes off, the first movable wing and the second movable wing are in the folded position, and the aircraft is in a biplane configuration; when the aircraft climbs to a predetermined height, the first movable wing and the second movable wing are deflected and moved to the unfolded position by means of the aerodynamic force and moment generated by deflection of aerodynamic control surfaces thereof and a differential thrust and moment generated by the distributed propulsion system, then the aircraft becomes a monoplane configuration with the super high aspect ratio; when landing is required at the end of cruising, the first movable wing and the second movable wing are deflected and moved to the folded position by means of the aerodynamic force and moment generated by the deflection of the aerodynamic control surfaces thereof and the differential thrust and moment generated by the distributed propulsion system, then the aircraft resumes the biplane configuration.

According to the aircraft with the super high aspect ratio based on the self-unfolding folding wing technology of the embodiment of the present disclosure, the fixed wing is provided with the first movable wing and the second movable wing which can move between the unfolded position and the folded position, so that the cruise drag of the aircraft is greatly reduced when flying at high altitude, long-endurance flight is realized, meanwhile, the aircraft can adapt to runways with different widths when taking off or landing, and can also take off and land under severe weather conditions.

According to an embodiment of the present disclosure, in the unfolded position, the first movable wing and the second movable wing respectively extend outwards along the spanwise direction of the fixed wing and are respectively connected with the end of the fixed wing, and in the folded position, the first movable wing and the second movable wing respectively extend inwards along the spanwise direction of the fixed wing from above the fixed wing and connected with each other.

According to an embodiment of the present disclosure, an orthographic projection of the first movable wing and the second movable wing in a plane where the fixed wing is located is approximately in the same straight line with the fixed wing.

According to an embodiment of the present disclosure, the fixed wing includes a first fixed wing located at one side of the aircraft body and a second fixed wing located at another side of the aircraft body. The movable wing assembly further includes: a first lever arm, a first end of the first lever arm being pivotally connected with the first fixed wing, and a second end of the first lever arm being pivotally connected with the first movable wing; and a second lever arm, a first end of the second lever arm being pivotally connected with the second fixed wing, and a second end of the second lever arm being pivotally connected with the second movable wing.

Alternatively, an axis of the aircraft body is vertically distributed with respect to an axis of the fixed wing. The first and second ends of the first lever arm and the first and second ends of the second lever arm have a rotation axis parallel to the axis of the aircraft body.

Alternatively, at least one of the first fixed wing and the first movable wing is provided with a first chute extending along the spanwise direction thereof, and at least a part of the first lever arm is located in the first chute in the unfolded position; at least one of the second fixed wing and the second movable wing has a second chute extending along the spanwise direction thereof, and at least a part of the second lever arm is located in the second chute in the unfolded position.

Alternatively, the first chute includes a first fixed wing chute formed in an outer end of the first fixed wing and a first movable wing chute formed in an inner end of the first movable wing; the second chute includes a second fixed wing chute formed in an outer end of the second fixed wing and a second movable wing chute formed in an inner end of the second movable wing.

According to an embodiment of the present disclosure, the distributed propulsion system is disposed at a side of the first movable wing and the second movable wing facing a head of aircraft body. Different types of propulsion systems for the distributed propulsion system are provided and include a plurality of first propulsion systems including a plurality of propellers and driven by engines, or a plurality of second propulsion systems driven by ducted propulsion devices or jet propulsion devices, and the first propulsion systems or the second propulsion systems are distributed at intervals along the spanwise direction of the first movable wing and the second movable wing.

Alternatively, the movable wing assembly further comprises engines for driving the propellers, and the engines are connected to a flight control system in the aircraft body.

According to an embodiment of the present disclosure, a rear edge of the first movable wing and the second movable wing is provided with the aerodynamic control surface, the aerodynamic control surface is driven by an actuator, and the actuator is connected to a flight control system in the aircraft body.

Alternatively, the actuator is an electric actuator or a hydraulic actuator.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the present disclosure will become apparent and more readily appreciated from the following descriptions made with reference to the accompanying drawings, in which.

Figure 1:
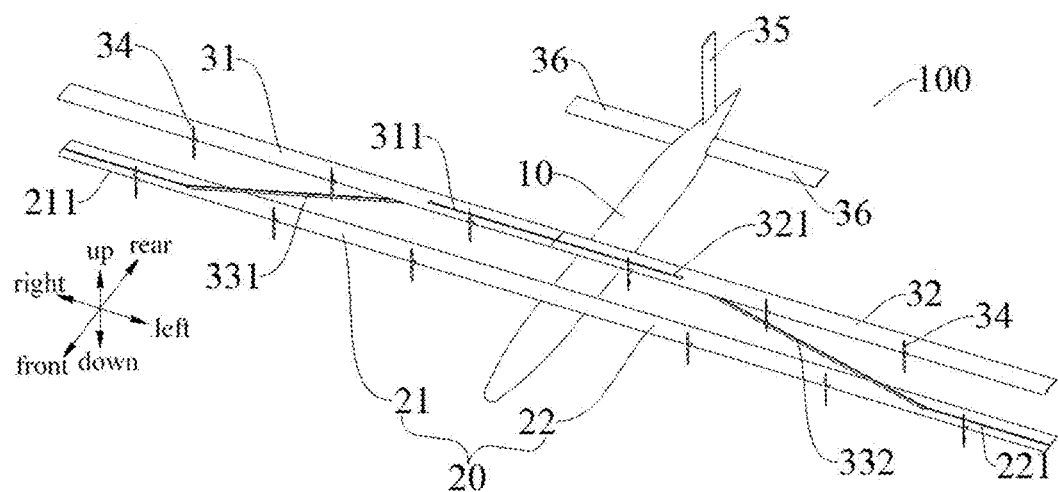
FIG. 1 is a schematic view illustrating the aircraft with a super high aspect ratio based on a self-unfolding folding wing technology according to embodiments of the present disclosure, in which a movable wing is in a folded state.

REFERENCE NUMERALS aircraft 100
aircraft body 10
fixed wing 20
first fixed wing 21, first fixed wing chute 211,
second fixed wing 22, second fixed wing chute 221,
first movable wing 31, first movable wing chute 311, left wing 312, right wing 313, aerodynamic control surface 314,
second movable wing 32, second movable wing chute 321,
first lever arm 331, second lever arm 332,
propeller 34, vertical tail 35, horizontal tail 36, engine 37.

DETAILED DESCRIPTION

Embodiments of the present disclosure are described below in detail, examples of the embodiments are shown in accompanying drawings, and reference signs that are the same or similar from beginning to end represent the same or similar components or components that have the same or similar functions. The embodiments described below with reference to the accompanying drawings are exemplary, are merely used to explain the present disclosure, and cannot be construed as a limit to the present disclosure.

In the descriptions of the embodiments of the present disclosure, it is to be understood that, terms such as "center", "length", "width", "upper", "lower", "front", "rear", "left", "right", "vertical", "horizontal", "top", "bottom", "inner", "outer", "axial", "radial", "circumferential", and "spanwise" should be construed to refer to the orientation as then described or as shown in the drawings under discussion. These relative terms are for convenience of description and do not require that the present disclosure be constructed or operated in a particular orientation, which cannot be construed as a limit to the present invention. In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present invention, "a plurality of" means two or more than two, unless specified otherwise.

An aircraft 100 with a super high aspect ratio based on a self-unfolding folding wing technology according to embodiments of the present disclosure will now be described with reference to FIGS. 1-8.

Referring to FIGS. 1-8, the aircraft 100 with the super high aspect ratio based on the self-unfolding folding wing technology according to embodiments of the present disclosure includes an aircraft body 10, a fixed wing 20, and a movable wing assembly.

Figure 5:
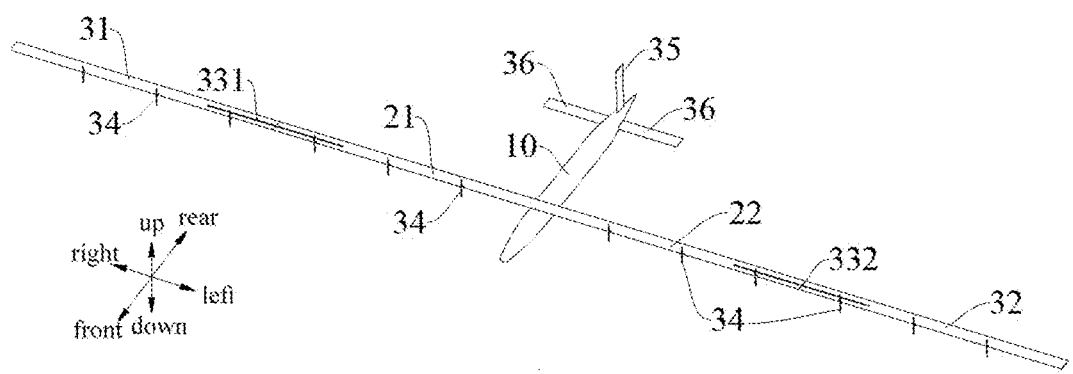
FIG. 5 is a schematic view illustrating the aircraft with the super high aspect ratio based on the self-unfolding folding wing technology according to embodiments of the present disclosure, in which the movable wing is in a fully unfolded state.

The fixed wing 20 is provided on the aircraft body 10. The movable wing assembly is provided on the fixed wing 20 and includes a first movable wing 31 and a second movable wing 32 which are movable between an unfolded position and a folded position. The "folded position" here refers to a position where the first movable wing 31 and the second movable wing 32 are located as shown in FIG. 1, and the "unfolded position" refers to a position where the first movable wing 31 and the second movable wing 32 are located as shown in FIG. 5. The first movable wing 31 and the second movable wing are respectively provided with an aerodynamic control surface 314 and a distributed propulsion system (not shown).

When the aircraft 100 takes off, the first movable wing 31 and the second movable wing 32 are in the folded position, and the aircraft 100 is of a biplane configuration. When the aircraft 100 climbs to a predetermined height, the first movable wing 31 and the second movable wing 32 are deflected and moved to the unfolded position by means of aerodynamic force and moment generated by deflection of aerodynamic control surfaces 314 at corresponding position and differential thrust and moment generated by a distributed propulsion system, and the aircraft 100 is of a monoplane configuration with the super high aspect ratio. When landing is required at the end of cruising, the first movable wing 31 and the second movable wing 32 are deflected and moved to the folded position by means of the aerodynamic force and moment generated by the deflection of the aerodynamic control surfaces 314 thereof and the differential thrust and moment generated by the distributed propulsion system, and the aircraft 100 resumes the biplane configuration.

The unfolding and folding of the movable wing assembly can be completed during the flight process. The unfolding and folding actions are realized by means of the aerodynamic force and moment generated by the deflection of the aerodynamic control surfaces 314 of the movable wings and the differential thrust and moment generated by the distributed propulsion system, without the need for additional unfolding and folding driving mechanism.

According to the aircraft 100 with the super high aspect ratio based on the self-unfolding folding wing technology of the embodiments of the present disclosure, the fixed wing 20 is provided with the first movable wing 31 and the second movable wing 32 which can move between the unfolded position and the folded position, so that the cruise drag of the aircraft 100 is greatly reduced when flying at high altitude, long-endurance flight is realized, meanwhile, the aircraft 100 can adapt to runways with different widths when taking off or landing, and can also take off and land under severe weather conditions.

Some specific embodiments of the aircraft 100 with the super high aspect ratio based on the self-unfolding folding wing technology according to embodiments of the present disclosure will be described below with reference to FIGS. 1-6.

Referring to FIGS. 1-6, the aircraft 100 with the super high aspect ratio based on the self-unfolding folding wing technology according to some embodiments of the present disclosure includes the aircraft body 10, the fixed wing 20, and the movable wing assembly. A flight control system is provided in the aircraft body 10. The aircraft body 10 extends in a front-rear direction as shown in FIG. 1.

The fixed wing 20 includes a first fixed wing 21 located at one side of the aircraft body 10 (the right side as shown in FIG. 1) and a second fixed wing 22 located at the other side of the aircraft body 10 (the left side as shown in FIG. 1). A left end of the first fixed wing 21 is connected with a right end of the second fixed wing 22. One side of the fixed wing 20 facing a head of the aircraft body 10 is provided with a plurality of propellers 34 arranged at intervals along a spanwise direction of the fixed wing 20 (left-right direction as shown in FIG. 1), and a rotation axis of each propeller 34 is vertical to the corresponding mounting surface.

According to some embodiments of the present disclosure, the movable wing assembly includes the first movable wing 31, the second movable wing 32, a first lever arm 331, and a second lever arm 332.

Figure 2:
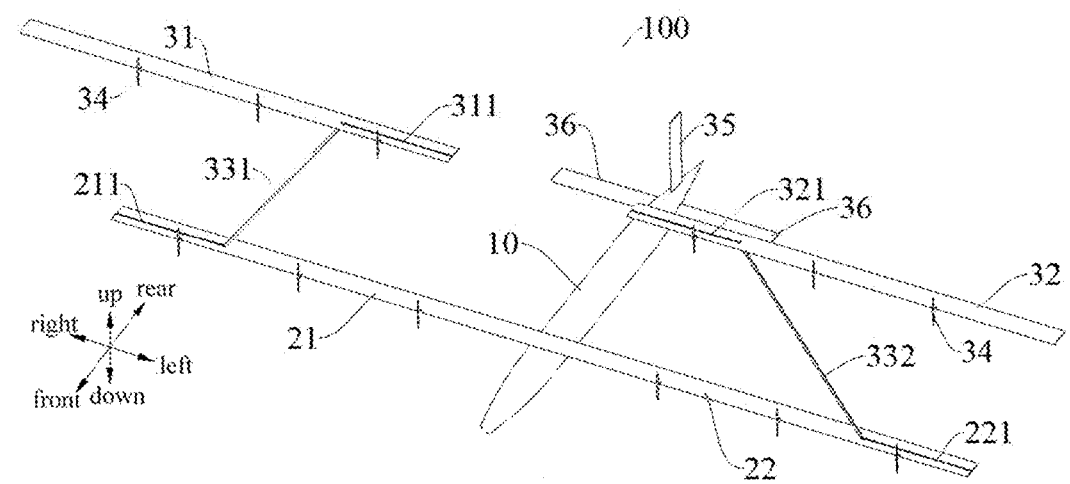
FIG. 2 is a schematic view illustrating the aircraft with the super high aspect ratio based on the self-unfolding folding wing technology according to embodiments of the present disclosure, in which the movable wing is not fully extended.
Figure 3:
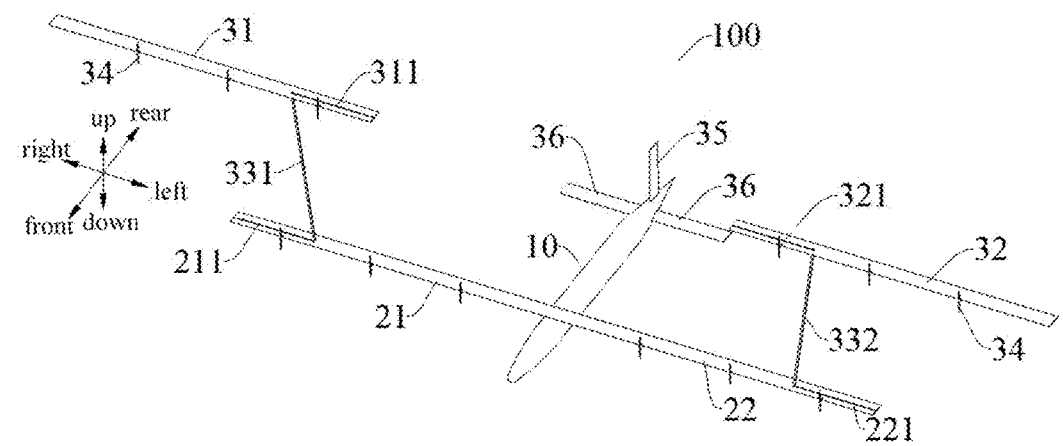
FIG. 3 is another schematic view illustrating the aircraft with the super high aspect ratio based on the self-unfolding folding wing technology according to embodiments of the present disclosure, in which the movable wing is not fully extended.
Figure 4:
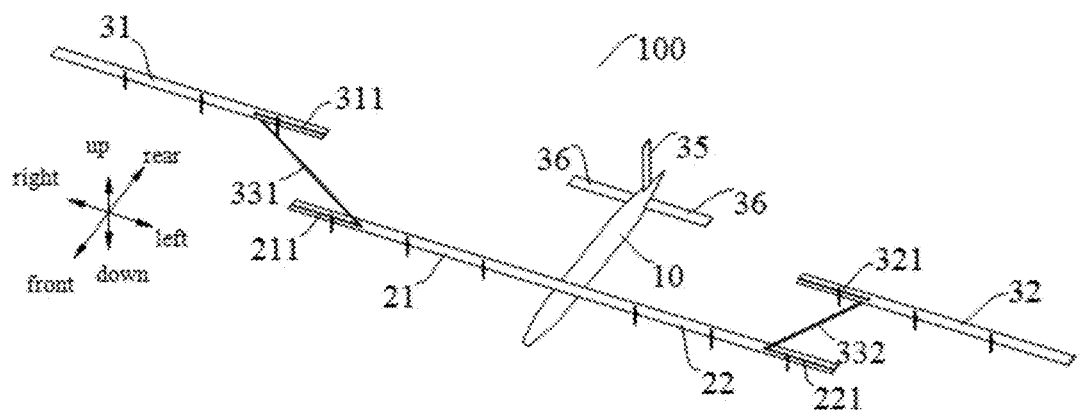
FIG. 4 is another schematic view illustrating the aircraft with the super high aspect ratio based on the self-unfolding folding wing technology according to embodiments of the present disclosure, in which the movable wing is not fully extended.

In some examples, a first end of the first lever arm 331 is pivotally connected with the first fixed wing 21 and a second end of the first lever arm 331 is pivotally connected with the first movable wing 31. A first end of the second lever arm 332 is pivotally connected with the second fixed wing 22, and a second end of the second lever arm 332 is pivotally connected with the second movable wing 32. Here, the "first end" refers to a lower end of the first lever arm 331/the second lever arm 332 as shown in FIGS. 2 and 3, and the "second end" refers to an upper end of the first lever arm 331/the second lever arm 332 as shown in FIGS. 2 and 3.

In some specific examples, the axis of the aircraft body 10 is vertically distributed with respect to the spanwise direction of the fixed wing 20, and a rotation axis of the first and second ends of the first lever arm 331 and the first and second ends of the second lever arm 332 are parallel to the axis of the aircraft body 10.

It can be understood that the first lever arm 331 and the second lever arm 332 are always rotated relative to the fixed wing 20 in a plane perpendicular to the axis of the aircraft body 10. Likewise, the first movable wing 31 and the second movable wing 32 are respectively rotated relative to the first lever arm 331 and the second lever arm 332 in the plane perpendicular to the axis of the aircraft body 10.

Further, an orthographic projection of the first movable wing 31 and the second movable wing 32 on a plane where the fixed wing 20 is located is substantially in a same straight line with the fixed wing 20. That is, the first movable wing 31 and the second movable wing 32 are always located in the same plane as the fixed wing 20 during the movement from the unfolded position to the folded position, respectively.

Certainly, the spanwise direction of the fixed wing 20 and the movable wing of the present disclosure is not limited thereto. The fixed wing 20, the first movable wing 21 and the second movable wing 32 may also be arranged obliquely backward relative to the axis of the aircraft body 10, that is, the fixed wing 20 and the movable wing of the present disclosure may also be in a swept-wing layout. During the unfolding and folding process of the movable wing, the orthographic projection of the first movable wing 31 in the plane where the fixed wing 20 is located is substantially in the same straight line with the first fixed wing 21, and the orthographic projection of the second movable wing 32 in the plane where the fixed wing 20 is located is substantially in the same straight line with the second fixed wing 22.

When the airplane 100 takes off, the first movable wing 31 and the second movable wing 32 are in the folded position, which can be regarded as a biplane structure arranged in the up-down direction.

When the aircraft 100 flies at high altitude, the first movable wing 31 and the second movable wing 32 move to the unfolded position. The first movable wing 31 and the second movable wing 32 respectively extend outward along the spanwise direction of the fixed wing 20 and are respectively connected with both ends of the fixed wing 20, thereby forming a complete cantilever monoplane structure. Therefore, the aspect ratio is increased so as to obtain lower induced drag, realize laminar flow drag reduction of the wing, further greatly reduce cruise drag, and realize long-endurance flight.

When the aircraft 100 needs to land at the end of cruising, the first movable wing 31 and the second movable wing 32 move to the folded position, and the first movable wing 31 and the second movable wing 32 respectively extend inwards along the spanwise direction of the fixed wing 20 from above the fixed wing 20 and connect with each other, thus forming a biplane structure arranged in the up-down direction.

Therefore, the aircraft 100 can not only take off and land at airports with lower grades and meet the requirements of airport runway width, but also has relatively small roll moment of inertia. Since the plane of the wing is adjacent to a central axis of the aircraft body 10 in the left-right direction as shown in FIGS. 1-5, the capability of resisting low-altitude airflow disturbance is enhanced, thereby ensuring that the aircraft 100 can take off and land under severe weather conditions.

According to an embodiment of the present disclosure, at least one of the first fixed wing 21 and the first movable wing 31 is provided with a first chute extending along the spanwise direction thereof, and at least a part of the first lever arm 331 is positioned in the first chute in the unfolded position.

Similarly, at least one of the second fixed wing 22 and the second movable wing 32 has a second chute extending along the spanwise direction thereof, and at least a part of the second lever arm 332 is positioned in the second chute in the unfolded position.

In some examples, as shown in FIGS. 1-5, the first chute includes a first fixed wing chute 211 formed in an outer end of the first fixed wing 21 and a first movable wing chute 311 formed in an inner end of the first movable wing 31. The first end of the first lever arm 331 is pivotally disposed in the first fixed wing chute 211, and the second end of the first lever arm 331 is pivotally disposed in the first movable wing chute 311.

Similarly, the second chute includes a second fixed wing chute 221 formed in an outer end of the second fixed wing 22 and a second movable wing chute 321 formed in an inner end of the second movable wing 32. The first end of the second lever arm 332 is pivotally disposed in the second fixed wing chute 221, and the second end of the second lever arm 332 is pivotally disposed in the second movable wing chute 321.

When the aircraft 100 flies at high altitude, a part of the first lever arm 331 is inserted into the first fixed wing chute 211, and the rest is inserted into the first movable wing chute 311. A part of the second lever arm 332 is inserted into the second fixed wing chute 221, and the rest is inserted into the second movable wing chute 321, such that the structure of the wing is more stable in flight.

According to an embodiment of the present disclosure, the sides of the first movable wing 31 and the second movable wing 32 facing the head of the aircraft body 10 are respectively provided with distributed propulsion systems.

Figure 6:
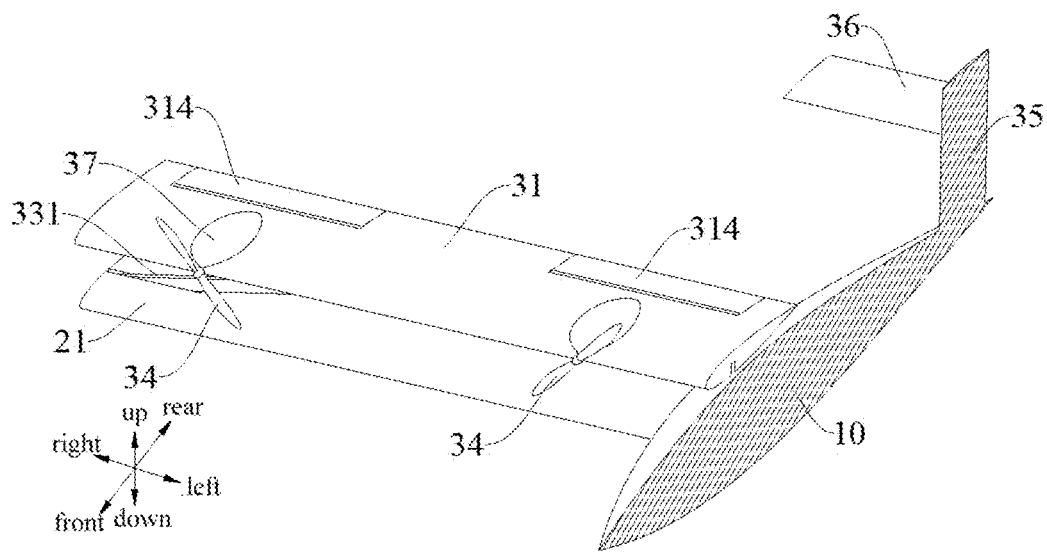
FIG. 6 is a sectional view illustrating the aircraft with the super high aspect ratio based on the self-unfolding folding wing technology according to embodiments of the present disclosure, in which the movable wing is in a folded state.

As shown in FIG. 6, in some examples, the distributed propulsion system includes a plurality of propellers 34 which are distributed at intervals along the spanwise direction and can rotate, and the rotation axis of each propeller 34 on the movable wing is also perpendicular to the corresponding mounting plane. Here, "spanwise direction" refers to a length direction of the first movable wing 31 and the second movable wing 32.

Further, the first movable wing 31 and the second movable wing 32 are respectively provided with engine 37 connected to a flight control system in the aircraft body 10. The engine 37 drives the propeller 34 to rotate, thereby generating a pulling force. The first movable wing 31 and the second movable wing 32 can move between the unfolded position and the folded position according to the flight state of the aircraft 100, and the operation is convenient.

Therefore, by using the engine 37 to drive the propeller 34 on the movable wing to rotate and the cooperation of the aerodynamic control surface 314, there is no need to adopt additional unfolding and folding driving mechanisms between the movable wing and the fixed wing 20.

In some alternative embodiments, the distributed propulsion system includes a plurality of ducted propulsion devices, such as ducted fan propellers, which are distributed at intervals along the spanwise direction and can rotate.

In some alternative embodiments, the distributed propulsion system includes a plurality of jet propulsion devices, such as turbojet engines or turbofan engines, distributed at intervals along their spanwise direction.

According to another embodiment of the present disclosure, as shown in FIG. 6, the side of the first movable wing 31 and the second movable wing 32 facing the tail of the aircraft body 10, i.e., the trailing edge of the movable wing, is provided with an aerodynamic control surface 314. The aerodynamic control surface 314 provided to the first movable wing 31 and the second movable wing 32 is driven by an actuator (e.g., an electric actuator or a hydraulic actuator), and the actuator is connected to the flight control system in the aircraft body 10. If an electric actuator is used for driving the aerodynamic control surface 314, there is no need for hydraulic oil line connection between the movable wing and the fixed wing 20, thus simplifying the structure of the movable wing and the like.

The unfolding/folding action of the movable wing according to the embodiments of the present disclosure is driven by means of defection and adjustment by the aerodynamic force and moment generated by the deflection of aerodynamic control surfaces 314 of the movable wings and the differential thrust and moment generated by a distributed propulsion system, thereby avoiding the introduction of additional energy sources and mechanisms and reducing the load of the linkage mechanism.

According to a further embodiment of the present disclosure, the tail of the aircraft body 10 is provided with a vertical tail 35 and a horizontal tail 36. Thus, the aircraft 100 is trimmed, and flight maneuverability of aircraft 100 is realized.

The principle of moving the first movable wing 31/the second movable wing 32 of the aircraft with the super high aspect ratio based on the self-unfolding folding wing technology according to the embodiment of the present disclosure between the unfolded position and the folded position will be described in detail below with reference to FIGS. 7 and 8.

The disclosure provides a folding and unfolding mode of the movable wing with a brand-new concept so as to realize the layout of the wing with the super high aspect ratio, and combines the self-unfolding technology, comprehensively applies the propulsion, aerodynamics and flight control technologies such that the wing does not need to be driven by an additional mechanism during folding and unfolding, thus being simple and reliable.

Figure 7:
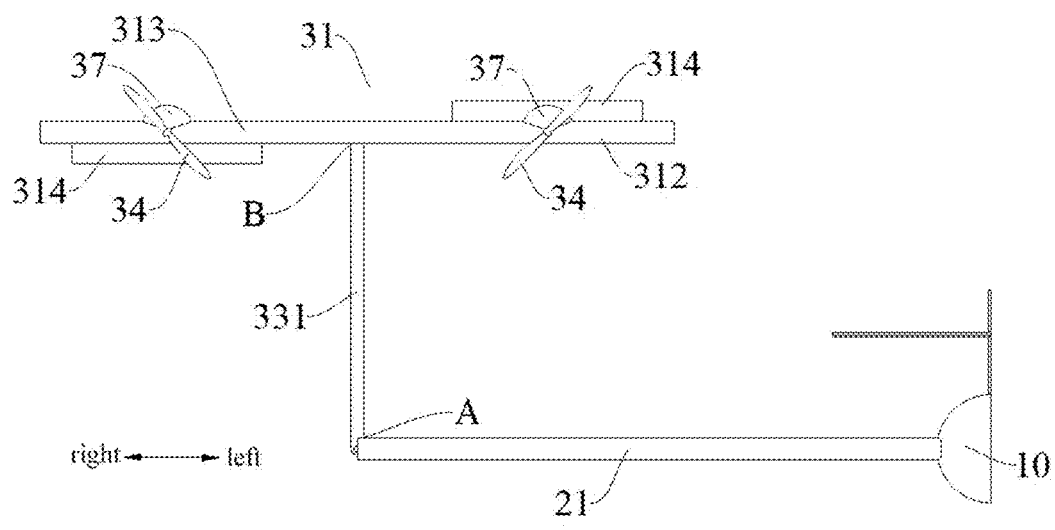
FIG. 7 is a simplified model of a first movable wing/a second movable wing of the aircraft with the super high aspect ratio based on the self-unfolding folding wing technology according to embodiments of the present disclosure.

Specifically, FIG. 7 shows the attitude of the aerodynamic control surface 314 during the unfolding of the movable wing. Each movable wing can be regarded as the high aspect ratio straight flying wing with limited degrees of freedom, which is connected with the fixed wing 20 through a lever arm (such as the first lever arm 331 in FIG. 7), and the movable wing is connected with the avionics and flight control systems of the aircraft body 10 through cables. The whole aircraft can be regarded as a combined aircraft including the high aspect ratio aircraft 100 and the high aspect ratio straight flying wings at a side of the left wing 312 and the right wing 313.

In order to study the movement of the movable wing, firstly the fixed wing 20 is regarded as a fixed point, and a relative movement of the movable wing relative to the fixed wing 20 is studied. Finally, on the basis of the relative movement of the movable wing, the movements of the aircraft body 10 and the fixed wing 20 are superimposed to obtain the state of motion of the movable wing.

The following description will take the first movable wing 31 as an example. As shown in FIGS. 7 and 8, during the unfolding of the first movable wing 31, the end A of the first lever arm rotates around a fulcrum of the fixed wing 20 along an axis parallel to the axial direction of the aircraft body 10. A center of the first movable wing 31 rotates around a hinge point of an end B of the first lever arm 331 along an axis parallel to the axial direction of the aircraft body 10 (the front-rear direction as shown in FIG. 7). The first movable wing 31 is translated in a plane perpendicular to the axial direction of the aircraft body 10.

The left wing 312 and the right wing 313 of the first movable wing 31 are respectively provided with aerodynamic control surfaces 314. When the aerodynamic control surfaces 314 of the left wing 312 and the right wing 313 of the first movable wing 31 are deflected in the same direction, an upward lift or a downward pressure can be provided. When the aerodynamic control surfaces 314 of the left wing 312 and the right wing 313 of the first movable wing 31 are differentially deflected, rolling moment and side force can be provided.

During the unfolding of the first movable wing 31, a rotation of a midpoint of the first movable wing 31 and the hinge point of the end B of the first lever arm 331 along an axis parallel to the left-right direction can be eliminated by the pitching control moment by deflection of the aerodynamic control surface 314. The rotation of the midpoint of the first movable wing 31 and the hinge point of the end B of the first lever arm 331 along an axis parallel to the up-down direction can be eliminated by the moment of the propellers 34 at the left and right sides of the first movable wing 31.

Figure 8:
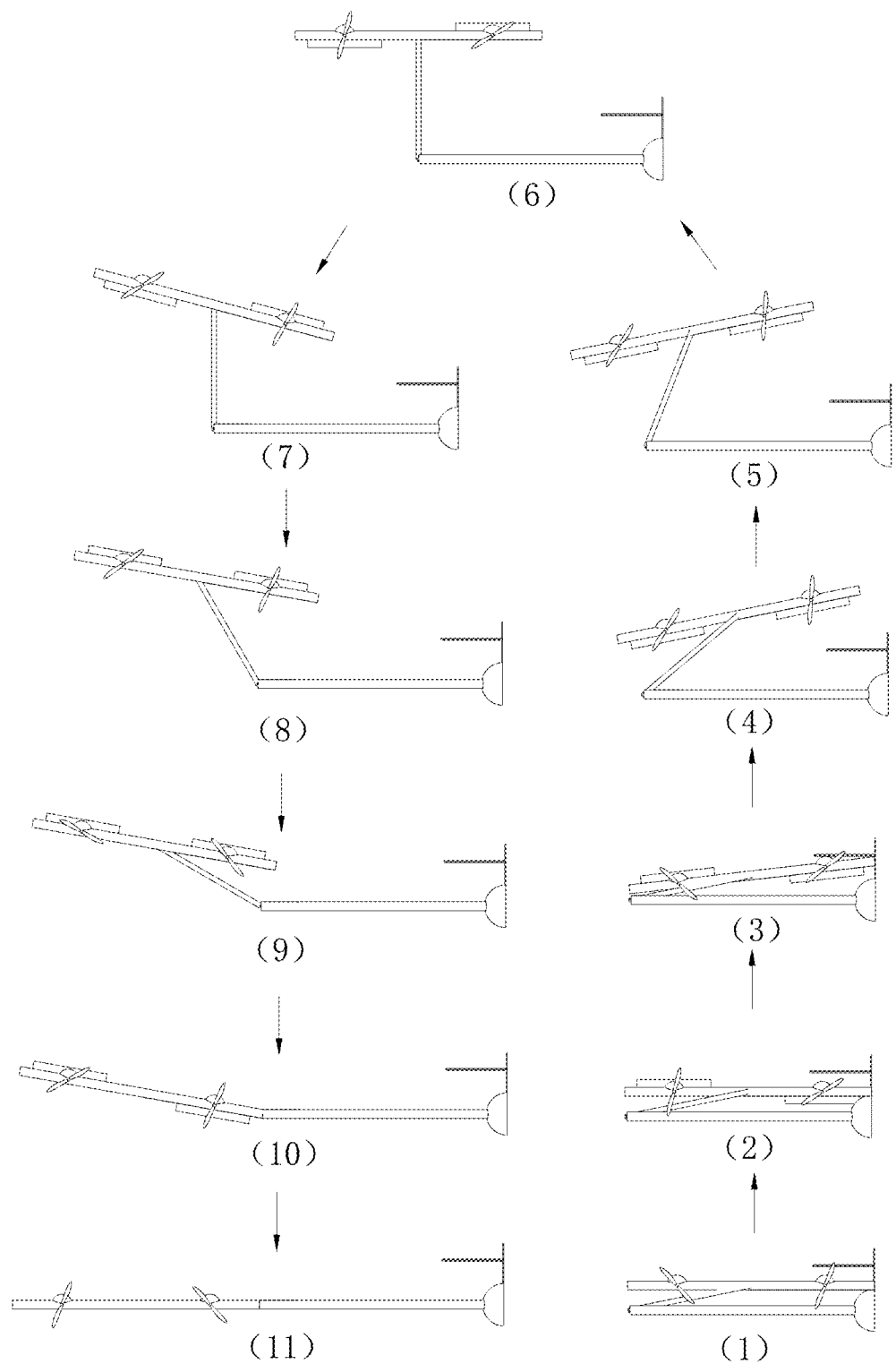
FIG. 8 is a schematic diagram illustrating a moving process of the movable wing of the aircraft with the super high aspect ratio based on the self-unfolding folding wing technology according to embodiments of the present disclosure from a folded position to an unfolded position.

FIG. 8 shows the self-unfolding process of the first movable wing 31. (1) shows the folded state of the first movable wing 31, (11) shows a state where the first movable wing 31 is fully unfolded, and (2)-(10) show transition states where the first movable wing 31 moves from the folded position to the unfolded position.

The movable wing of the aircraft 100 with the super high aspect ratio based on the self-unfolding folding wing technology according to the embodiments of the present disclosure realizes self-unfolding mainly through the control of the aerodynamic control surface 314 and the distributed propulsion system, and the key point of the design is to coordinate the multi-body movement between the movable wing and the fixed wing 20. The conceptual design needs to consider the influence of the change of the centroid, the lift, the center of lift, and the thrust line on the stability and manipulability of the aircraft 100 during the unfolding process. The movable wing shall be equipped with flight attitude measurement and flight control equipment, and the flight control system of the movable wing cooperates with the flight control system of the aircraft body 10 to complete the control of the unfolding and folding of the three-body combined aircraft with limited degrees of freedom. The aircraft 100 can be applied to high-altitude long-endurance reconnaissance planes, and can also be popularized and applied to platforms such as transport planes, airborne warning and control system, tankers, and the like.

Other configurations and operations of the aircraft 100 according to embodiments of the present disclosure are known to those skilled in the art and will not be described in detail herein.

In the description of the present disclosure, reference throughout this specification to "an embodiment," "some embodiments," "illustrative embodiments", "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. An aircraft with a super high aspect ratio based on a self-unfolding folding wing technology, comprising:
   an aircraft body;
   a fixed wing provided on the aircraft body; and
   a movable wing assembly provided on the fixed wing and comprising a first movable wing and a second movable wing movable between an unfolded position and a folded position, wherein the first movable wing and the second movable wing are respectively provided with an aerodynamic control surface and a distributed propulsion system,
   wherein when the aircraft takes off and lands, the first movable wing and the second movable wing are deflected and moved to the folded position by means of aerodynamic force and moment generated by deflection of the aerodynamic control surfaces and a differential thrust and moment generated by the distributed propulsion system; and when the aircraft climbs to a predetermined height, the first movable wing and the second movable wing are deflected and moved to the unfolded position by means of the aerodynamic force and moment generated by the deflection of aerodynamic control surfaces and the differential thrust and moment generated by the distributed propulsion system.

2. The aircraft with the super high aspect ratio based on the self-unfolding folding wing technology according to claim 1, wherein in the unfolded position, the first movable wing and the second movable wing respectively extend outwards along a spanwise direction of the fixed wing and are respectively connected with both ends of the fixed wing, and in the folded position, the first movable wing and the second movable wing respectively extend inwards along the spanwise direction of the fixed wing from above the fixed wing and connect with each other.

3. The aircraft with the super high aspect ratio based on the self-unfolding folding wing technology according to claim 2, wherein an orthographic projection of the first movable wing and the second movable wing in a plane where the fixed wing is located in the same straight line with the fixed wing.

4. The aircraft with the super high aspect ratio based on the self-unfolding folding wing technology according to claim 3, wherein the distributed propulsion system is disposed at a side of the first movable wing and the second movable wing, and
different types of propulsion systems for the distributed propulsion system are provided and comprise a plurality of first propulsion systems comprising a plurality of propellers and driven by engines, or a plurality of second propulsion systems driven by ducted propulsion devices or jet propulsion devices, and the first propulsion systems or the second propulsion systems are distributed at intervals along the spanwise direction of the first movable wing and the second movable wing.

5. The aircraft with the super high aspect ratio based on the self-unfolding folding wing technology according to claim 3, wherein a rear edge of the first movable wing and the second movable wing is provided with the aerodynamic control surface, the aerodynamic control surface being driven by an actuator, the actuator being connected to a flight control system in the aircraft body.

6. The aircraft with the super high aspect ratio based on the self-unfolding folding wing technology according to claim 2, wherein the fixed wing comprises a first fixed wing located at one side of the aircraft body and a second fixed wing located at another side of the aircraft body, and
the movable wing assembly further comprises:
a first lever arm, a first end of the first lever arm being pivotally connected with the first fixed wing, and a second end of the first lever arm being pivotally connected with the first movable wing; and
a second lever arm, a first end of the second lever arm being pivotally connected with the second fixed wing, and a second end of the second lever arm being pivotally connected with the second movable wing.

7. The aircraft with the super high aspect ratio based on the self-unfolding folding wing technology according to claim 6, wherein the first and second ends of the first lever arm and the first and second ends of the second lever arm have a rotation axis parallel to an axis of the aircraft body.

8. The aircraft with the super high aspect ratio based on the self-unfolding folding wing technology according to claim 7, wherein the distributed propulsion system is disposed at a side of the first movable wing and the second movable wing, and
different types of propulsion systems for the distributed propulsion system are provided and comprise a plurality of first propulsion systems comprising a plurality of propellers and driven by engines, or a plurality of second propulsion systems driven by ducted propulsion devices or jet propulsion devices, and the first propulsion systems or the second propulsion systems are distributed at intervals along the spanwise direction of the first movable wing and the second movable wing.

9. The aircraft with the super high aspect ratio based on the self-unfolding folding wing technology according to claim 6, wherein at least one of the first fixed wing and the first movable wing is provided with a first chute extending along the spanwise direction thereof, and at least a part of the first lever arm is located in the first chute in the unfolded position, and
at least one of the second fixed wing and the second movable wing has a second chute extending along the spanwise direction thereof, and at least a part of the second lever arm is located in the second chute in the unfolded position.

10. The aircraft with the super high aspect ratio based on the self-unfolding folding wing technology according to claim 9, wherein the first chute comprises a first fixed wing chute formed in an outer end of the first fixed wing and a first movable wing chute formed in an inner end of the first movable wing, and
the second chute comprises a second fixed wing chute formed in an outer end of the second fixed wing and a second movable wing chute formed in an inner end of the second movable wing.

11. The aircraft with the super high aspect ratio based on the self-unfolding folding wing technology according to claim 10, wherein the distributed propulsion system is disposed at a side of the first movable wing and the second movable wing, and
different types of propulsion systems for the distributed propulsion system are provided and comprise a plurality of first propulsion systems comprising a plurality of propellers and driven by engines, or a plurality of second propulsion systems driven by ducted propulsion devices or jet propulsion devices, and the first propulsion systems or the second propulsion systems are distributed at intervals along the spanwise direction of the first movable wing and the second movable wing.

12. The aircraft with the super high aspect ratio based on the self-unfolding folding wing technology according to claim 9, wherein the distributed propulsion system is disposed at a side of the first movable wing and the second movable wing, and
different types of propulsion systems for the distributed propulsion system are provided and comprise a plurality of first propulsion systems comprising a plurality of propellers and driven by engines, or a plurality of second propulsion systems driven by ducted propulsion devices or jet propulsion devices, and the first propulsion systems or the second propulsion systems are distributed at intervals along the spanwise direction of the first movable wing and the second movable wing.

13. The aircraft with the super high aspect ratio based on the self-unfolding folding wing technology according to claim 6, wherein the distributed propulsion system is disposed at a side of the first movable wing and the second movable wing, and
different types of propulsion systems for the distributed propulsion system are provided and comprise a plurality of first propulsion systems comprising a plurality of propellers and driven by engines, or a plurality of second propulsion systems driven by ducted propulsion devices or jet propulsion devices, and the first propulsion systems or the second propulsion systems are distributed at intervals along the spanwise direction of the first movable wing and the second movable wing.

14. The aircraft with the super high aspect ratio based on the self-unfolding folding wing technology according to claim 6, wherein a rear edge of the first movable wing and the second movable wing is provided with the aerodynamic control surface, the aerodynamic control surface being driven by an actuator, the actuator being connected to a flight control system in the aircraft body.

15. The aircraft with the super high aspect ratio based on the self-unfolding folding wing technology according to claim 2, wherein the distributed propulsion system is disposed at a side of the first movable wing and the second movable wing, and different types of propulsion systems for the distributed propulsion system are provided and comprise a plurality of first propulsion systems comprising a plurality of propellers and driven by engines, or a plurality of second propulsion systems driven by ducted propulsion devices or jet propulsion devices, and the first propulsion systems or the second propulsion systems are distributed at intervals along the spanwise direction of the first movable wing and the second movable wing.

16. The aircraft with the super high aspect ratio based on the self-unfolding folding wing technology according to claim 2, wherein a rear edge of the first movable wing and the second movable wing is provided with the aerodynamic control surface, the aerodynamic control surface being driven by an actuator, the actuator being connected to a flight control system in the aircraft body.

17. The aircraft with the super high aspect ratio based on the self-unfolding folding wing technology according to claim 1, wherein the distributed propulsion system is disposed at a side of the first movable wing and the second movable wing facing a head of aircraft body, and different types of propulsion systems for the distributed propulsion system are provided and comprise a plurality of first propulsion systems comprising a plurality of propellers and driven by engines, or a plurality of second propulsion systems driven by ducted propulsion devices or jet propulsion devices, and the first propulsion systems or the second propulsion systems are distributed at intervals along a spanwise direction of the first movable wing and the second movable wing.

18. The aircraft with the super high aspect ratio based on the self-unfolding folding wing technology according to claim 17, wherein the movable wing assembly further comprises engines for driving the propellers, and the engines are connected to a flight control system in the aircraft body.

19. The aircraft with the super high aspect ratio based on the self-unfolding folding wing technology according to claim 1, wherein a rear edge of the first movable wing and the second movable wing is provided with the aerodynamic control surface, the aerodynamic control surface being driven by an actuator, the actuator being connected to a flight control system in the aircraft body.

20. The aircraft with the super high aspect ratio based on the self-unfolding folding wing technology according to claim 19, wherein the actuator is an electric actuator or a hydraulic actuator.

* * * * *